United States Patent [19]

Bridges

[11] Patent Number: 4,864,408
[45] Date of Patent: Sep. 5, 1989

[54] LIGHT BOX WITH IMPROVED SPECTRAL RESPONSE FOR CCD IMAGER

[75] Inventor: Mark E. Bridges, Spencerport, N.Y.

[73] Assignee: Eastman Kodak Company, Rochester, N.Y.

[21] Appl. No.: 265,156

[22] Filed: Oct. 31, 1988

[51] Int. Cl.$^4$ .............................................. H04N 3/14
[52] U.S. Cl. ..................................... 358/214; 358/229
[58] Field of Search ................................ 358/214–216, 358/209, 229, 225

[56] References Cited

U.S. PATENT DOCUMENTS

| | | | |
|---|---|---|---|
| 4,506,300 | 3/1985 | Fearnside | 358/209 |
| 4,554,585 | 11/1985 | Carlson | 358/209 |
| 4,570,179 | 2/1986 | Lees | 358/209 |
| 4,805,028 | 2/1989 | Nishioka et al. | 358/225 |

Primary Examiner—Jin F. Ng
Assistant Examiner—Stephen Brinich
Attorney, Agent, or Firm—Robert M. Wallace

[57] ABSTRACT

A charge coupled device image sensor in a film-to-video player senses light transmitted through a frame of film from a light box. The light box houses a tungsten halogen bulb at one end and a diffuser at the opposite end adjacent the film. An intermediate opaque pyramidal surface, or "flag", prevents direct light from the bulb reaching the diffuser. The apex of the pyramidal flag is centered with and aimed at the filament of the bulb, and has a hole through it the size of the filament, permitting a small beam of light directly from the filament to reach the center of the diffuser. All interior box surfaces (including the flag) are blue, to compensate for the chrominance response of the charge coupled device sensor. The pyramidal flag and the hole in the pyramidal apex provides a uniform light intensity across the surface of the diffuser.

3 Claims, 3 Drawing Sheets

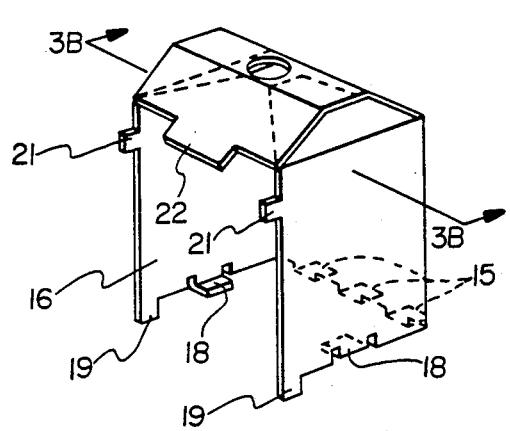
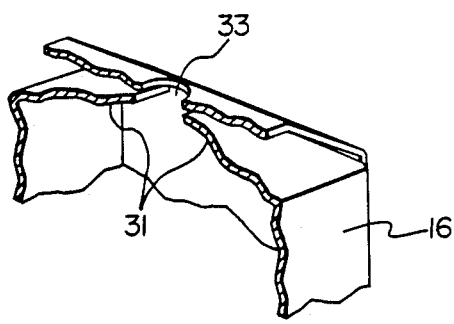
FIG. 3A
FIG. 3B
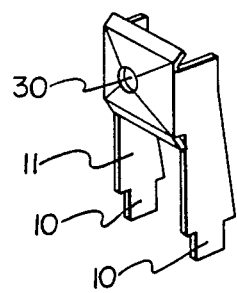
FIG. 4
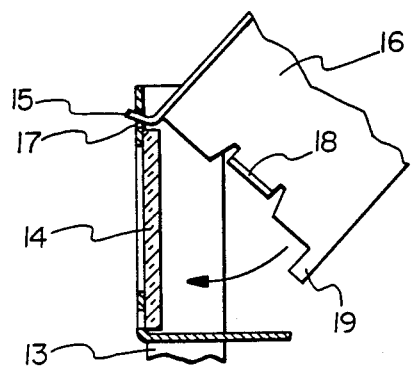
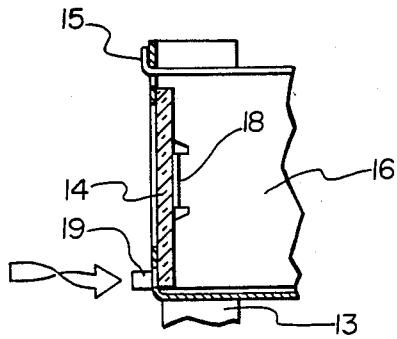
FIG. 5A
FIG. 5B

FLAG REMOVED

OPAQUE FLAG

FLAG WITH HOLE

LIGHT BOX WITH IMPROVED SPECTRAL RESPONSE FOR CCD IMAGER

BACKGROUND OF THE INVENTION

A source of light is required at the film plane for imaging a silver halide source onto a CCD device. Various illumination means may be employed for this including a reflector bulb and condenser lens system as found in the Kodak Carousel slide projector, or a rectangular integrating box with an internal lamp, diffuser material nearest the film plane and a "flag", (i.e., means of preventing direct bulb illumination of the diffuser) as found in the Elmo slide to video unit. Various light reflectors are well-known, including those disclosed in:

Jones: U.S. Pat. No. 1,050,466, Jan. 14, 1913
Squyres: U.S. Pat. No. 3,711,701, Jan. 16, 1973
Shank: U.S. Pat. No. 3,737,226, Oct. 22, 1971
Halvorson: U.S. Pat. No. 1,640,448, Aug. 30, 1927
Brandt: U.S. Pat. No. 2,831,104, Apr. 15, 1958
Miyamoto: U.S. Pat. No. 4,707,773, Nov. 17, 1987
Hulbert: U.S. Pat. No. 3,754,135, Aug. 21, 1973
Tsuda, et al.: U.S. Pat. No. 3,920,311, Nov. 18, 1975
Dobrowolski: U.S. Pat. No. 4,649,462, Mar. 10, 1987
Sheringham: Can. Pat. No. 238,091, July 6, 1920

PROBLEMS

There are inherent problems with each of the above-mentioned light sources. The condenser lens system is bulky, requires a costly bulb and optics and needs adjustment at time of assembly. The rectangular integrating box, while less costly, is not very efficient and does not provide very uniform output at the film plane. Changing the bulb is awkward because it is located within the box.

SUMMARY OF THE INVENTION

A charge coupled device image sensor in a film-to-video player senses light transmitted through a frame of film from a light box. The light box houses a tungsten halogen bulb at one end and a diffuser at the opposite end adjacent the film. An intermediate opaque pyramidal surface, or "flag", prevents direct light from the bulb reaching the diffuser. The apex of the pyramidal flag is centered with and aimed at the filament of the bulb, and has a hole through it the size of the filament, permitting a small beam of light directly from the filament to reach the center of the diffuser. All interior box surfaces (including the flag) are blue, to compensate for the chrominance response of the charge coupled device sensor. The pyramidal flag and the hole in the pyramidal apex provides a uniform light intensity across the surface of the diffuser.

DESCRIPTION OF THE DRAWINGS

The invention may be understood by reference to the accompanying drawings, of which:

FIG. 3A is a section through the back of the housing;
FIG. 3B is a sectional view depicting the rear of the housing;
FIG. 4 is a view of the flag;
FIG. 5A shows the assembly procedure;
and
FIG. 5B depicts the clamping action and fastening method for the lamp box.

DETAILED DESCRIPTION

Figure 1:
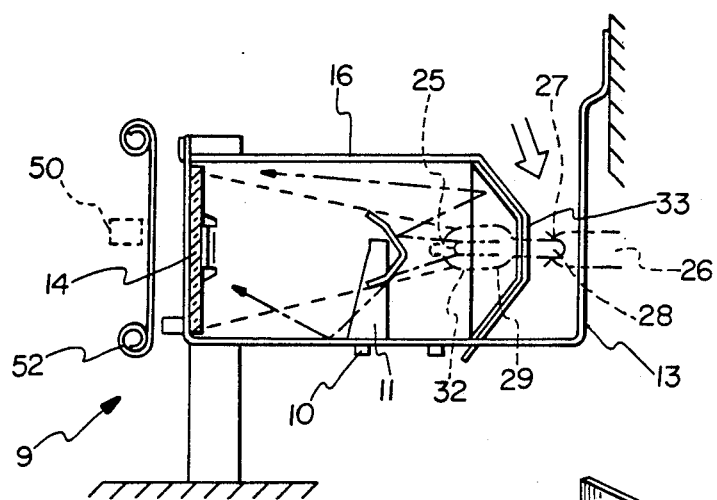
FIG. 1 shows an elevational section through the center of the light box.

In order to achieve a balance between cost, uniformity, efficiency, light amplitude, bulb longevity, size, ease of bulb replacement and meeting spectral requirements of a CCD, the light box in FIG. 1 was designed.

Tabs C 10 of a flag 11 are inserted into slots C 12 of a baffle 13 and twisted to form a partial shear of the tab, thereby holding the parts securely.

Figure 2A:
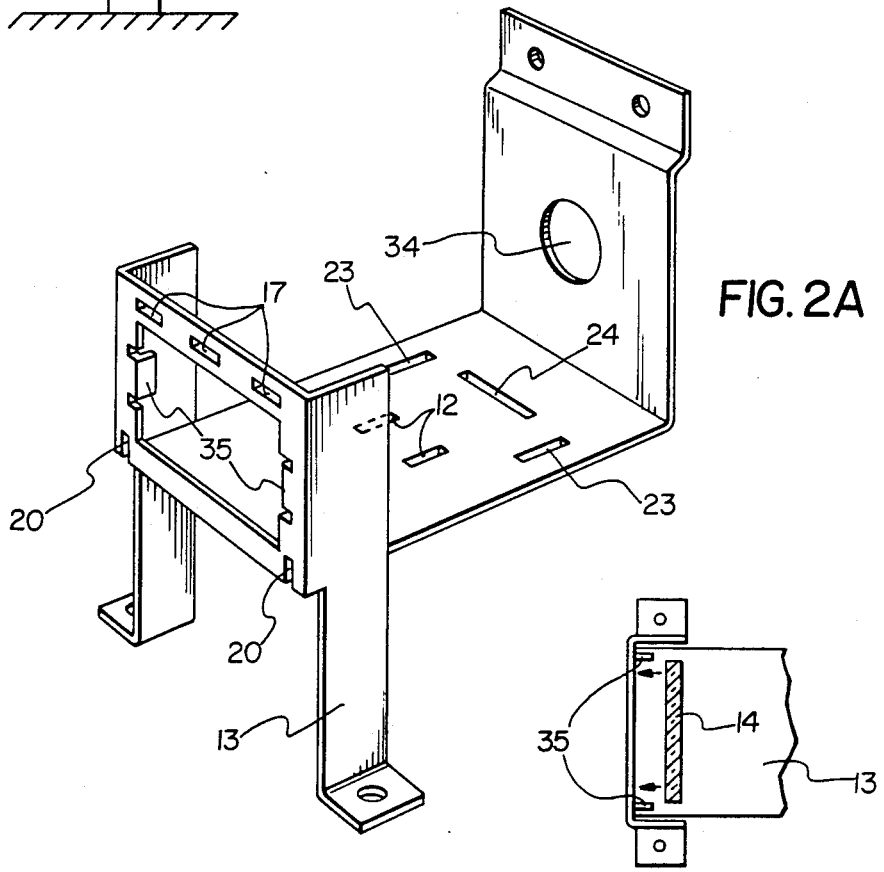
FIG. 2A is an isometric view of the baffle.
Figure 2B:
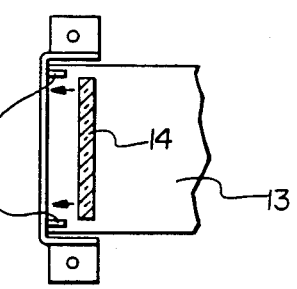
FIG. 2B is a view from above the baffle showing how the diffuser glass is located.

A diffuser 14 is located between diffuser alignment tabs 35 as shown in FIG. 2B. Tabs A 15 of a housing 16 are inserted into slots A 17 of the baffle 13 as shown in FIG. 5A. They act as hinges when the housing 16 is rotated towards the front of the baffle 13. The clamping diffuser tabs 18 contact the diffuser 14, urging it towards the front of the housing 16. In FIG. 5B, the clamping tabs 18 deflect as tabs B 19 are aligned with slots B 20, inserted and twisted securely thereby holding the diffuser 14 in place.

Tabs E 21 and D 22 are inserted in slots E 23 and slot D 24 respectively, then twisted securely. The light box 9, now fully assembled as shown in FIG. 1, is then installed in a film-to-video player having a CCD sensor 50 facing the diffuser 14 through film 52.

The relationship of the parts shown in FIG. 1 is such that a lamp filament 25 of a lamp 32 protrudes into the box 9 through a lamp hole 33 and a bulb seal 28 while an electrical socket 27 of the lamp 32 is outside the box 9 held by long, sheet metal lamp socket contacts 26 which protrude through the baffle 13 via baffle hole 34. This arrangement allows airflow to cool the bulb seal 28 while the exterior glass skin 29 of the bulb 32, located in the box 9 away from direct airflow, is maintained at a temperature recommended by the bulb manufacturer, thus contributing to bulb longevity. Ease of bulb replacement is achieved by employing the concept disclosed in U.S. Pat. application Ser. No. 142,629 filed January 11, 1988 entitled "Light Bulb Socket Soft Start And Power Interrupt Assembly". Preferably, the lamp 32 is a tungsten halogen cycle bulb.

FIG. 4 shows that the flag 11 is shaped like a four-sided pyramid having an apex centered at a hole 30 about the size of the lamp filament 25 and aimed axially at the filament 25. This shape is more efficient than the flat type of flag, found in devices from other manufacturers. Light is reflected off the flag 11 as shown in FIG. 1, up to the reflector surface tabs 31 (shown in FIG. 3B) and out towards the diffuser 14. It redirects the light instead of blocking it as a flat flag would. It is sized so it just blocks the direct light emitted from the envelope 29 immediately outboard of the filament 25 at the diffuser 14. The hole 30 allows a portion of the light emitted by the filament 25 to directly strike the diffuser 14.

Figure 6A:
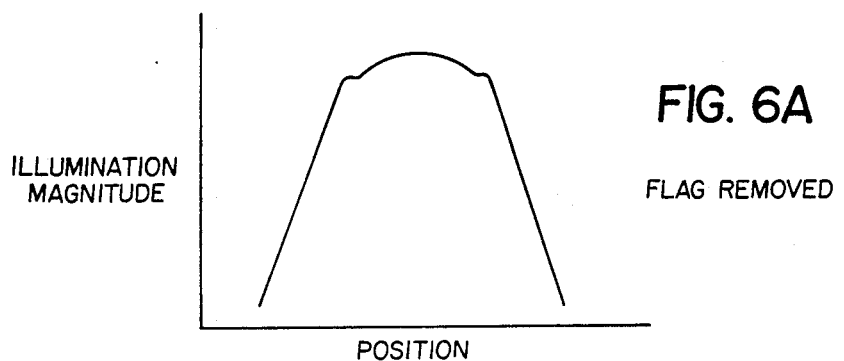
FIGS. 6A-6C show illumination level profiles across the diffuser glass.
Figure 6B:
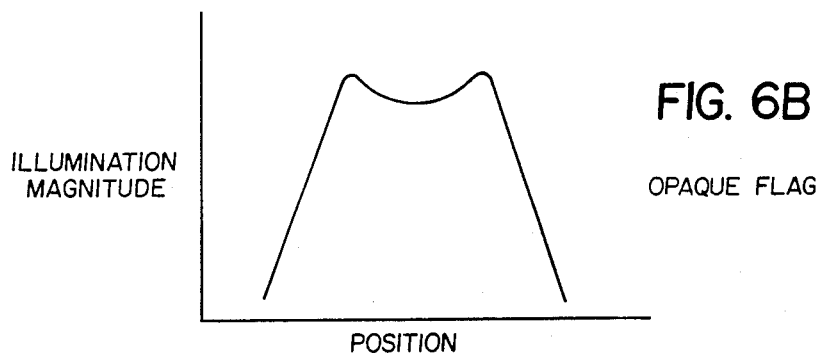
Figure 6C:
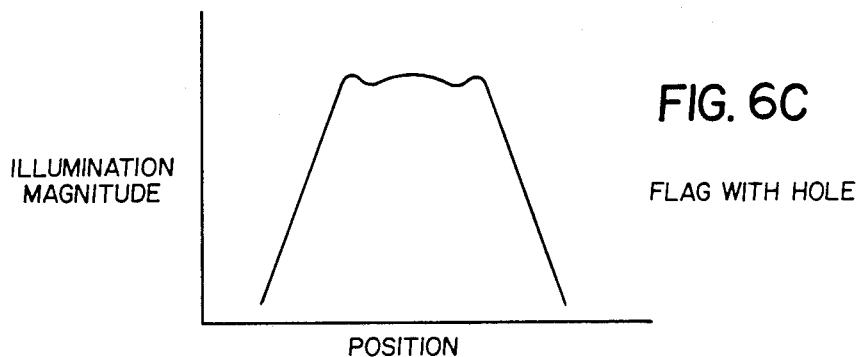

FIG. 6A shows the illumination level across the central portion of the diffuser 14 with the flag 11 removed from an otherwise complete light box 9. It is indicative of a hot spot on the diffuser. FIG. 6B shows the effect of adding a completely opaque flag 11 without hole 30. It is indicative of a dark spot on the diffuser. FIG. 6C shows the more even illumination distribution achieved by adding a hole 30 to the flag 11. Hole size is determined by filament 25 size and proximity to the flag 11.

The reflector surface tabs 31 are formed so as to be positioned around and behind the lamp envelope 29.

The functional end of the housing shown in FIG. 3B can best be visualized by cutting the bottom out of a half gallon paper milk carton and looking up at the top from the inside. This triangular-section shape directs the light towards the front of the housing 16 in an indirect manner to aid in uniformity and increasing light output (compared to a rectangular box) while keeping the number of parts and fasteners to a minimum for a low cost unit.

When assembled as shown in FIG. 1, the light box 9 is strong and compact. The housing 16, flag 11 and baffle 13 are made of aluminum with a polished surface of known reflectivity such as Kinglux C16. On all three parts, the polished surfaces face the bulb 32. The housing 16 and baffle 13 parts forming the box are anodized blue. The light reflected off the inner surfaces of the box 9 picks up a blue cast. Because the box 9 is blue, all other colors are absorbed. This is beneficial for the silicon based CCD utilized in this application because devices of this type have relatively poor responses in the blue region. The concentration of dye used in the anodizing process determines how much blue light can be reflected and how much of other colors are absorbed. In this way the lamp box's 9 spectral output can be tuned to the requirements of the CCD without the use of additional spectral filtering parts.

While the invention has been described in detail with reference to preferred embodiments thereof, it is understood that variations and modifications may be made without departing from the spirit and scope of the invention.

What is claimed is:

1. A film-to-video player comprising:

a charge coupled device image sensor having an image plane which faces a film plane spaced from said image plane;

a light box which transmits light to said image plane through said film plane, said light box comprising:

a housing having an inner surface, said housing including two opposite ends, one of said opposite ends being adjacent said image plane;

a light bulb mounted at the other of said opposite ends;

a diffuser mounted at said one end of said housing facing said image plane;

a convex surface located between said two opposite ends and having an apex aimed at said light bulb, said apex being characterized by a small hole therethrough which permits a beam of light to pass directly from said light bulb to said diffuser, said beam of light characterized by a diameter corresponding to said hole in said apex; and a blue coating of predetermined reflectivity covering all of the surfaces of said housing which face said light bulb, said coating having a color which compensates for the chrominance response of said image sensor.

2. The film-to-video player of claim 1 wherein said light bulb includes a small filament inside its interior and wherein said small hole in said apex is in alignment with said filament and has a diameter corresponding to the size of said filament; said light box having a pyramidal opaque surface.

3. The film-to-video player of claim 2 wherein said other end of said box comprises a surface comprising two intersecting planes disposed with respect to one another at an acute angle whose apex is centered with respect to the apex of said pyramidal opaque surface.

* * * * *